United States Patent [19]

Bozik et al.

[11] 3,730,957

[45] May 1, 1973

[54] PROCESS FOR COUPLING LOWER OLEFINS

[75] Inventors: John E. Bozik, Plum Borough, Pa.; John A. Ondrey, Tyler, Tex.; Harold E. Swift, Gibsonia, Pa.

[73] Assignee: Gulf Research & Development Company, Pittsburgh, Pa.

[22] Filed: Dec. 14, 1970

[21] Appl. No.: 98,018

Related U.S. Application Data

[63] Continuation-in-part of Ser. No. 660,901, Aug. 16, 1967, abandoned, which is a continuation-in-part of Ser. No. 588,311, Oct. 21, 1966, abandoned.

[52] U.S. Cl.........260/673, 260/465 H, 260/465.8 R, 260/650 A, 260/654 R, 260/666 A, 260/668 R, 260/670, 260/680 R
[51] Int. Cl............................C07c 3/20, C07c 11/12
[58] Field of Search..................260/680, 604 R, 673, 260/668 C, 666 A, 670

[56] References Cited

UNITED STATES PATENTS

| | | | |
|---|---|---|---|
| 3,557,235 | 1/1971 | Henry et al. | 260/668 |
| 3,631,216 | 12/1971 | Lipsig | 260/680 |
| 3,644,550 | 2/1972 | Beuther et al. | 260/673 |
| 3,644,551 | 2/1972 | Ondrey et al. | 260/673 |

FOREIGN PATENTS OR APPLICATIONS

| | | | |
|---|---|---|---|
| 950,686 | 2/1964 | Great Britain | 260/604 R |
| 951,513 | 3/1964 | Great Britain | 260/604 R |
| 1,015,180 | 12/1965 | Great Britain | 260/604 R |

*Primary Examiner*—Paul M. Coughlan, Jr.
*Attorney*—Meyer Neishloss, Deane E. Keith and Donald L. Rose

[57] ABSTRACT

Propylene, isobutylene and related olefins are coupled at elevated temperatures in the presence of oxygen and a catalyst comprising bismuth together with another metal in a binary metal oxide compound to produce higher molecular weight olefinic and aromatic compounds.

15 Claims, No Drawings

PROCESS FOR COUPLING LOWER OLEFINS

This application is a continuation-in-part of Ser. No. 660,901 filed Aug. 16, 1967, now abandoned, which is a continuation-in-part of Ser. No. 588,311, filed Oct. 21, 1966, now abandoned.

This invention relates to the dimerization of olefins and more particularly it relates to the catalytic oxydehydrodimerization of propylene, isobutylene and their substituted derivatives using binary metal oxide compounds comprising bismuth.

Heretofore, methods for the linear dimerization of propylene and isobutylene have in general been unsatisfactory. Conversion to the higher compounds, when possible, has only been accomplished at considerable expense and low yield. For example, the vapor phase reaction of propylene in the presence of hydrogen peroxide to produce 1,5-hexadiene, also known as diallyl, has been accomplished but only in poor yields. Also, 1,5-hexadiene can be prepared by the reaction of two mols of allyl chloride with copper oxide and by the reaction of allyl chloride with propylene, but these reactions have the disadvantage of requiring the use of relatively expensive halogenated compounds.

In accordance with our invention we have discovered that propylene, isobutylene and substituted derivatives thereof, can be coupled of dimerized to olefinic and aromatic compounds in the presence of complex metal oxide compounds comprising bismuth. The coupling reaction preferentially occurs at the site of an easily removable hydrogen atom, that is a hydrogen atom on a carbon atom not a part of the double bond. Thus in the example of propylene the easily removable hydrogen atom is in the 3-position. Specific olefins useful herein include propylene, isobutylene and substituted propylene and isobutylene having a functional group which will not readily oxidize or decompose at the conditions at which oxydehydrodimerization occurs. Examples of such functional groups include halogen (fluorine, chlorine, bromine and iodine), nitrile, phenyl, isocyanate, halogen substituted methyl, halogen substituted phenyl, and the like. Of particular interest are those compounds which may be represented by the formula

$$CH_2 = CR - CH_3$$

in which R is hydrogen, methyl or the functional group.

In most instances a product mixture of at least two compounds is obtained by the coupling reaction. This may be the result of both dimerization and cyclization reactions taking place. For example, propylene yields a mixture of 1,5-hexadiene, benzene and 1,3-cyclohexadiene. Isobutylene produces a mixture of 2,5-dimethyl-1,5-hexadiene and p-xylene, while 2-chloropropylene produces a mixture of 2,5-dichloro-1,5-hexadiene and p-dichlorobenzene, and methacrylonitrile products a mixture of 2,5-nitrilo-1,5-hexadiene and terephthalonitrile. In all instances the dimer product will be a mixture of compounds containing an even number of carbon atoms.

In accordance with our invention we have discovered that the coupling reaction occurs at appropriate conditions in the presence of a suitable catalyst. Useful as a catalyst herein are binary metal oxide compounds containing bismuth and one other suitable metal such as titanium, tin, zirconium, iron, niobium, tantalum and the like. Examples of these complex metal oxides include $Bi_2TiO_5$, $Bi_2Ti_2O_7$, $Bi_4(TiO_4)_3$, $Bi_2(SnO_3)_3$, $Bi_2(ZrO_3)_3$, $BiFeO_3$, and the like. Such compounds tend to be more stable against reduction of the bismuth to bismuth metal particularly at higher operating temperatures. These complex metal oxides can be supported on a suitable material or can be mixed with another material, such as silicon carbide, alumina and the like, as a diluent.

A significant aspect of our process relates to the conditions of operation and their proper intercorrelation to obtain the desired products and product distribution. In addition to catalyst formulation these conditions include temperature, pressure, time of contact of the reactant gas with the catalyst, the mol ratio of olefin to oxygen, and the mol percent of olefin, oxygen and inert diluent gas. The use of appropriate conditions and their correlation not only determines the course of the dimerization reaction but in addition affects the relative proportions of the desired unsaturated hydrocarbons that are produced, the percent conversion of the olefin and the conversion efficiency, that is, the percent selectivity to the desired hydrocarbons. The primary competing undesired reaction is the complete oxidation of the hydrocarbon compounds to carbon dioxide and water. Since unreacted olefin can readily be separated and recycled, the loss of olefin by combustion represents the prime process inefficiency.

If the reaction gas mixture is heated to a sufficiently high temperature in the absence of catalyst, a partial conversion to carbon dioxide and water occurs. Therefore, in carrying out the process it is preferred that the reaction gas is not preheated to a temperature at which significant loss by this reaction can take place prior to contact with the catalyst. In this preferred embodiment the catalyst itself is heated and the relatively cool reaction gas is introduced into the hot catalyst bed whereupon it is heated up to reaction temperature. Reaction to produce the desired products begins at a temperature of about 475° to 500° C. in the catalyst bed and will take place up to that temperature at which the catalyst is destroyed. The upper temperature limit is in part dependent on the olefin partial pressure, this upper temperature limit varying inversely with the olefin partial pressure. Optimum results for the oxydehydrodimerization of propylene as determined by percent conversion and selectively are obtained within a temperature range of about 525° to 625° C. and a preferred range of about 550° to 600° C. More reactive olefins such as isobutylene will react effectively at a somewhat lower temperature, for example 500° C. The preferred reaction temperature for any reactant gas is related to the ease of hydrogen atom removal in the reaction environment in addition to the specific conditions and catalyst. The upper practical operating temperature for propylene is about 675° C., but this again is partly dependent on the propylene partial pressure. Since the reactions involved are exothermic, it follows that heat is generated within the catalyst bed during oxydehydrogenation. It has been determined by direct measurements within the catalyst bed from the inlet zone to the outlet zone that the bed temperature reaches a maximum in a hot zone which is the temperature that is specified as the temperature of reaction.

It is necessary that the ratio of olefin, oxygen, and inert diluent gas be adjusted to insure that the explosive limits of the reaction mixture are not exceeded within the conditions of temperature and pressure utilized. Nitrogen, carbon dioxide, steam and the noble gases such as helium, etc. are included in the group of suitable inert gases. By inert is meant that the gas must be substantially non-reactive in the reaction environment. In essence the inert diluent serves as an essential control of the reaction rate by controlling the partial pressure of the reaction gases. The ratio of olefin to oxygen, specified as mol ratio, volume ratio or partial pressure ratio, may vary from about 0.5 to about 10 with a ratio of about 0.5 to 4 being preferred and a ratio of about 0.5 to 2 being most preferred, provided that the process is operated overall outside the explosive limits of the reaction gases. The ratio may be above 10, up to about 100, for example, provided that the operating conditions of reactant gas stream flow and the like are adjusted to maintain conversion and selectivity at suitable levels. The contact time, measured as the volume of the gaseous mixture to the volume of the catalyst used, should be within the range of 0.2 to 6.0 seconds or within a preferred range of one to four seconds.

The reaction may be carried out at a pressure ranging from subatmospheric to several hundred p.s.i.g., however, a pressure of about atmospheric up to about two to five atmospheres is preferred to avoid the requirement of using pressure equipment capable of withstanding the elevated temperature involved in the reaction. As the pressure increases, the temperature required for equivalent reaction will decrease. When operating at atmospheric pressure, a partial pressure of olefin of between about 0.02 and 0.55 atmosphere is recommended with a partial pressure of between about 0.06 and 0.3 being preferred and a partial pressure of oxygen between about 0.02 and 0.50 atmosphere is recommended with a range of between about 0.035 and 0.15 atmosphere being preferred. At higher operating pressures the same ratios of olefin to oxygen, as specified above, will prevail. However, in this instance the partial pressure of each constituent may exceed the limits indicated for operation at atmospheric pressure, provided that the explosive limits of the mixture are avoided by use of a sufficient quantity of inert diluent gas.

Although the mechanism of the reactions is not fully understood, it is believed that the reactions taking place in the oxydehydrodimerization of propylene can be represented by the following equations:

$$2CH_2{=}CH{-}CH_3 + \tfrac{1}{2}O_2 \rightarrow CH_2{=}CH{-}CH_2{-}CH_2{-}CH{=}CH_2 + H_2O$$

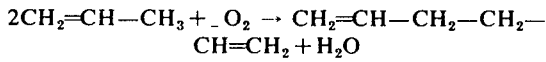

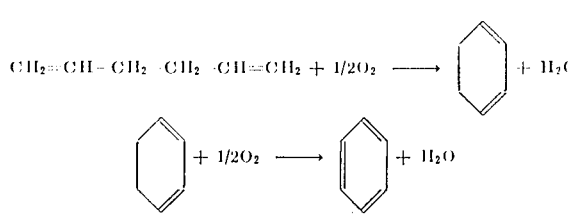

Therefore, it is not unexpected to discover a mixture of the linear diolefin, the cyclic diolefin and the aromatic compound in the product. The cyclic diolefin occurs, if at all, as a minor constituent.

The following examples are set out to illustrate the novel process of the invention and to provide a better understanding of its details and advantages.

EXAMPLE 1

A bismuth titanate catalyst was prepared by grinding 155.2 grams $Bi(NO_3)_3 \cdot 5H_2O$ and 19.6 grams $TiO_2$ together with 10 cc. ethyl alcohol. After complete mixing had taken place, the slurry was oven dried for four hours at 120° C. The dried material was then calcined for 28 hours in air at 750° C., ground to a fine powder, and again calcined as before. According to x-ray diffraction analysis, $Bi_4(TiO_4)_3$ was identified as the main constituent in the catalyst. The bismuth titanate was tableted and broken into 10/20 mesh particles. Other complex metal oxide catalysts were prepared in the same manner by substituting an appropriate amount of the other metal oxide for the titanium dioxide.

EXAMPLE 2

A glass reactor 45 cm. in length and 7 mm. in internal diameter was used. A 6 cc. portion of the bismuth titanate catalyst was inserted to a depth of 18 cm. in the center section of the glass reactor on a quartz-wool support. The catalyst bed was heated by an externally mounted electric furnace to a temperature of 575° C. throughout the reaction period with little heating above or below the bed. The reactant gases were premixed in a manifold containing an inert filler or packing material to give good mixing but were not preheated in order to reduce degradation to carbon dioxide. If preheating of these gases is undertaken, the temperature should preferably be controlled prior to catalyst contact at a level where degradation to $CO_2$ is minimal.

The propylene-air-helium gas mixture was flowed through the reactor at the rate of 40 cc. of propylene, 100 cc. of air and 200 cc. of helium per minute for a period of about 1 hour. The effluent gases were passed in sequence through a wet ice-cooled trap to remove most of the water vapor, then through dry ice-acetone cooled traps to condense out the organic products, and finally through a bed of solid carbon dioxide absorbent. The condensed liquid product was analyzed by mass spectroscopy and gas chromatography. The results of this run and comparison runs utilizing other binary metal oxide catalysts containing bismuth and another metal are set forth in Table I, in which conversion refers to the total propylene reacted and selectively refers to the percent converted to $C_6$ hydrocarbons with the mol percent in the condensed organic liquid of several of these desired products being indicated.

TABLE I

| Run No. | Catalyst | Conversion | Selectivity | Di-allyl | Benzene | 1,3-Cyclohexadiene |
|---|---|---|---|---|---|---|
| 1 | $Bi_4(TiO_4)_3$ | 20.2% | 61% | 43.9% | 40.2% | 8.6% |
| 2 | $Bi(SnO_3)_3$ | 18 | 60 | 40.3 | 45.7 | 5.2 |
| 3 | $Bi_2(ZrO_3)_3$ | 18 | 56 | 50 | 26.6 | 10.0 |
| 4 | $BiFeO_3$ | 16.1 | 42 | 49.1 | 34.6 | 10.9 |
| 5 | $Bi_2Ti_2O_7$ | 18.2 | 67 | 44.7 | 34.9 | 10.8 |

The primary undesired by-products of this process are carbon dioxide and water resulting from the total combustion of some of the propylene or other hydrocarbon types. The major constituents of the condensed organic liquid not reported in Table I are water and propylene. Also analysis of the effluent propylene gas indicated that almost no conversion to propane, ethane, ethylene, methane, or hydrogen was taking place.

Whether in the presence or absence of oxygen, the dimerization of propylene to diallyl at any given temperature, if feasible, is thermodynamically less favorable than the reaction to benzene. Therefore, when diallyl is the preferred product, catalyst selection and operating conditions must be carefully correlated consistent with the teachings herein to insure the greatest yield of the desired product at economical conditions of operation. In this instance the benzene and 1,3-cyclohexadiene are regarded as by-products, albeit valuable. Furthermore, it is preferred to carry out the conversion at conditions which will exhaust all free oxygen to forestall degradation to carbon dioxide in the effluent gas otherwise effluent gas quenching may be required. On the other hand, if the oxygen is used up prior to the end of the catalyst bed, not only may thermal conversion of diallyl to benzene occur, but also degradation of the $C_6$ products to undesired materials can take place.

The condensed liquid product can be separated by fractionation into its components, including a diallyl fraction and a benzene-1,3-cyclohexadiene fraction. The latter two may be separated by fractional crystallization, or alternatively, the 1,3-cyclohexadiene in this fraction may be directly converted to benzene in the presence of a dehydrogenation catalyst. When benzene is the desired end product, the diallyl by-product can readily be converted to benzene in a separate reaction by passing vaporized diallyl over a suitable dehydrocyclization catalyst.

Dimerization of isobutylene and the substituted derivatives is carried out within the ranges of conditions specified for propylene with these conditions properly adjusted and intercorrelated in each specific reaction for optimization of the desired results. The conditions of reaction including temperature, partial pressures, and catalyst contact time must be carefully intercorrelated and adjusted to the catalyst and to the specific olefin or olefin mixture undergoing reaction in order to obtain optimum yield of the desired products and a minimum degradation to carbon dioxide and water. Although air is preferred as the source of oxygen due to convenience and cost, other sources of oxygen including pure oxygen may be used provided that any diluting gases are inert in the present reaction. In any event some diluent gas will be required. Overall yields may be increased by the injection of a portion of the oxygen, either pure or diluted, into an appropriate portion of the catalyst bed as the reaction is taking place.

Once the oxydehydrogenative reactions have been initiated, it may be necessary to control overheating resulting from the exothermic nature of the reaction. For example, the reactor may be cooled externally by suitable means. Alternatively, cooling coils or the like may be distributed through the catalyst bed for temperature control. Also, control may be enhanced by reducing the density distribution of the active portion of the catalyst by admixture with silicon carbide, alpha alumina or equivalent material. The supplemental addition of oxygen with diluent gas into the catalyst bed can be utilized to perform the additional function of supplementing temperature control.

It is to be understood that the above disclosure is by way of specific example and that numerous modifications and variations are available to those of ordinary skill in the art without departing from the true spirit and scope of our invention.

We claim:

1. The method for the synthesis of compounds of the formula

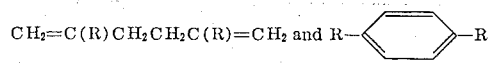

wherein R is hydrogen, methyl, halogen, nitrile, phenyl, isocyanate, halogen substituted methyl, or halogen substituted phenyl which comprises heating a gas consisting essentially of oxygen and an olefin having the formula

wherein R is defined above at dehydrodimerization temperatures of at least about 500° C. up to about 675° C., the molar ratio of said olefin to oxygen being from about 0.5 to 1 up to about 100 to 1, in the presence of a material consisting essentially of a binary metal oxide compound of bismuth and a metal selected from titanium, zirconium, tin, iron, niobium, and tantalum.

2. The method in accordance with claim 1 in which the olefin is propylene.

3. The method in accordance with claim 1 in which the olefin is isobutylene.

4. The method in accordance with claim 1 in which the temperature is about 525° C. to about 625° C.

5. The method in accordance with claim 4 in which there is substantially no oxygen gas in the product stream.

6. The method in accordance with claim 1 in which the material is $Bi_4(TiO_4)_3$.

7. The method in accordance with claim 1 in which the material is $Bi(SnO_3)_3$.

8. The method in accordance with claim 1 in which the material is $Bi_2(ZrO_3)_3$.

9. The method in accordance with claim 1 in which the material is $BiFeO_3$.

10. The method in accordance with claim 1 in which the material is $Bi_2Ti_2O_7$.

11. The method in accordance with claim 1 in which the metal is titanium.

12. The method in accordance with claim 1 in which the temperature is between about 550° C. and about 600° C.

13. The method in accordance with claim 1 in which the molar ratio of olefin to oxygen is between about 0.5:1 and about 10:1.

14. The method in accordance with claim 1 in which the molar ratio of olefin to oxygen is between about 0.5:1 and about 4:1.

15. The method in accordance with claim 1 in which the molar ratio of olefin to oxygen is between about 0.5:1 and about 2:1.

* * * * *